United States Patent
Singh

(10) Patent No.: US 10,733,713 B1
(45) Date of Patent: *Aug. 4, 2020

(54) NON-MAXIMUM SUPPRESSION IN IMAGE DATA

(71) Applicant: Ambarella International LP, Santa Clara, CA (US)

(72) Inventor: Manish K. Singh, Mountain House, CA (US)

(73) Assignee: Ambarella International LP, Santa Clara, CA (US)

( * ) Notice: Subject to any disclaimer, the term of this patent is extended or adjusted under 35 U.S.C. 154(b) by 106 days.

This patent is subject to a terminal disclaimer.

(21) Appl. No.: 16/180,395

(22) Filed: Nov. 5, 2018

Related U.S. Application Data

(63) Continuation of application No. 15/291,273, filed on Oct. 12, 2016, now Pat. No. 10,157,454.

(51) Int. Cl.
*G06T 5/20* (2006.01)
*G06T 5/00* (2006.01)

(52) U.S. Cl.
CPC .............. *G06T 5/20* (2013.01); *G06T 5/002* (2013.01); *G06T 2207/20192* (2013.01)

(58) Field of Classification Search
CPC .. G06T 5/20; G06T 5/002; G06T 2207/20192
See application file for complete search history.

(56) References Cited

U.S. PATENT DOCUMENTS

| | | | |
|---|---|---|---|
| 9,165,369 B1* | 10/2015 | Zhang | G06K 9/628 |
| 2003/0113020 A1* | 6/2003 | Tu | G06K 9/00201 |
| | | | 382/190 |
| 2010/0098293 A1* | 4/2010 | Chandraker | G06K 9/32 |
| | | | 382/103 |
| 2012/0306904 A1* | 12/2012 | Francois | G06T 7/11 |
| | | | 345/589 |
| 2016/0063349 A1* | 3/2016 | Kern | G06K 9/6212 |
| | | | 382/199 |
| 2017/0069092 A1* | 3/2017 | Bell | G05D 1/0246 |
| 2017/0300773 A1* | 10/2017 | Poddar | G06K 9/00986 |

* cited by examiner

*Primary Examiner* — Ming Y Hon
(74) *Attorney, Agent, or Firm* — Christopher P. Maiorana, PC

(57) ABSTRACT

An apparatus includes a first circuit, a second circuit and a third circuit. The first circuit may be configured to set a flag where a current value in a current line of an image is a maximum value in a first window in the current line. The second circuit may be configured to reset the flag based on one or more previous lines of the image where the current value is not a largest value in a second window around the current value. The third circuit may be configured to generate an output value as (i) the current value if the flag is set and (ii) a predetermined value if the flag is reset.

20 Claims, 10 Drawing Sheets

NON-MAXIMUM SUPPRESSION IN IMAGE DATA

This application relates to U.S. Ser. No. 15/291,273 filed Oct. 12, 2016, which is incorporated by reference in its entirety.

FIELD OF THE INVENTION

The invention relates to image processing generally and, more particularly, to a method and/or apparatus for implementing a non-maximum suppression in image data.

BACKGROUND

A non-maximum suppression process is often used with edge detection techniques and with computer vision tasks for object detection and tracking. The non-maximum suppression process sets all current pixel values to zero in a neighborhood around each current pixel if the current pixel is not a local maxima value. If the local maxima value is an absolute maximum value in the neighborhood, the local maxima value is a true result of the non-maximum suppression process.

It would be desirable to implement a non-maximum suppression in image data.

SUMMARY

The invention concerns an apparatus including a first circuit, a second circuit and a third circuit. The first circuit may be configured to set a flag where a current value in a current line of an image is a maximum value in a first window in the current line. The second circuit may be configured to reset the flag based on one or more previous lines of the image where the current value is not a largest value in a second window around the current value. The third circuit may be configured to generate an output value as (i) the current value if the flag is set and (ii) a predetermined value if the flag is reset.

BRIEF DESCRIPTION OF THE FIGURES

Embodiments of the invention will be apparent from the following detailed description and the appended claims and drawings in which:

DETAILED DESCRIPTION OF THE EMBODIMENTS

Embodiments of the present invention include providing a non-maximum suppression in image data that may (i) compute a running maximum in a local neighborhood among arriving pixels, (ii) store at most approximately half the raster scan lines at any given time, (iii) implement a layered approach, (iv) be implemented as hardware only and/or (v) be implemented as one or more integrated circuits.

Embodiments of the invention generally provide a non-maximum suppression processing component in smart camera systems and/or computer vision systems with analytical capabilities. The analytical capabilities may include, but are not limited to, security cameras, automotive cameras, and drone cameras capable of doing tasks such as lane detection, pedestrian detection and tracking, obstacle avoidance, and the like. In various embodiments, the invention may be implemented in only hardware.

The non-maximum suppression process may operate on two-dimensional images (e.g., frames, fields or pictures). Each image may have a height (e.g., H) and a width (e.g., W). A neighborhood may be set as a number of rows (e.g., M) by a number of columns (e.g., N) and is generally referred to as an NMS window. Multiple NMS windows may fit into each image. The number of rows M in each NMS window is generally smaller than the height H of the images. The number of columns N in each NMS window is generally smaller than the width W of the images. A size of input images (e.g., H×W) may match a size of output images.

In a hardware implementation, or a system on chip implementation, input pixels in the input images are generally received in a raster scan order (e.g., left-to-right across each row and row-by-row top-to-bottom). The input images may be provided from an image sensor, from another image processing hardware block, directly read from an external memory or internal memory, or from any source of video and/or still pictures. A running maximum value across the width N of each raster line in each NMS window may be computed and stored in a line buffer memory. A corresponding set of flags may also be stored in the line buffer memory to record if a maximum occurred at each current pixel position. In various embodiments, only up to one half (e.g., integer (M/2) rounded up, or ceiling [M/2] the number of raster lines (M) of each NMS window may be stored in the line buffer memory at all times.

After one or more initial raster lines are written into the line buffer memory, one or more previous (or earlier) raster lines may be read from line buffer memory and used to modify the flag of the current input pixel where the current input pixel is suppressed from the top. After half the raster lines have been stored, generation of the output pixels may begin. During the generation of the output pixels, one or more next (or later) raster lines may be used to modify the flag of the current output pixel when the current output pixel is suppressed from the bottom.

Figure 1:
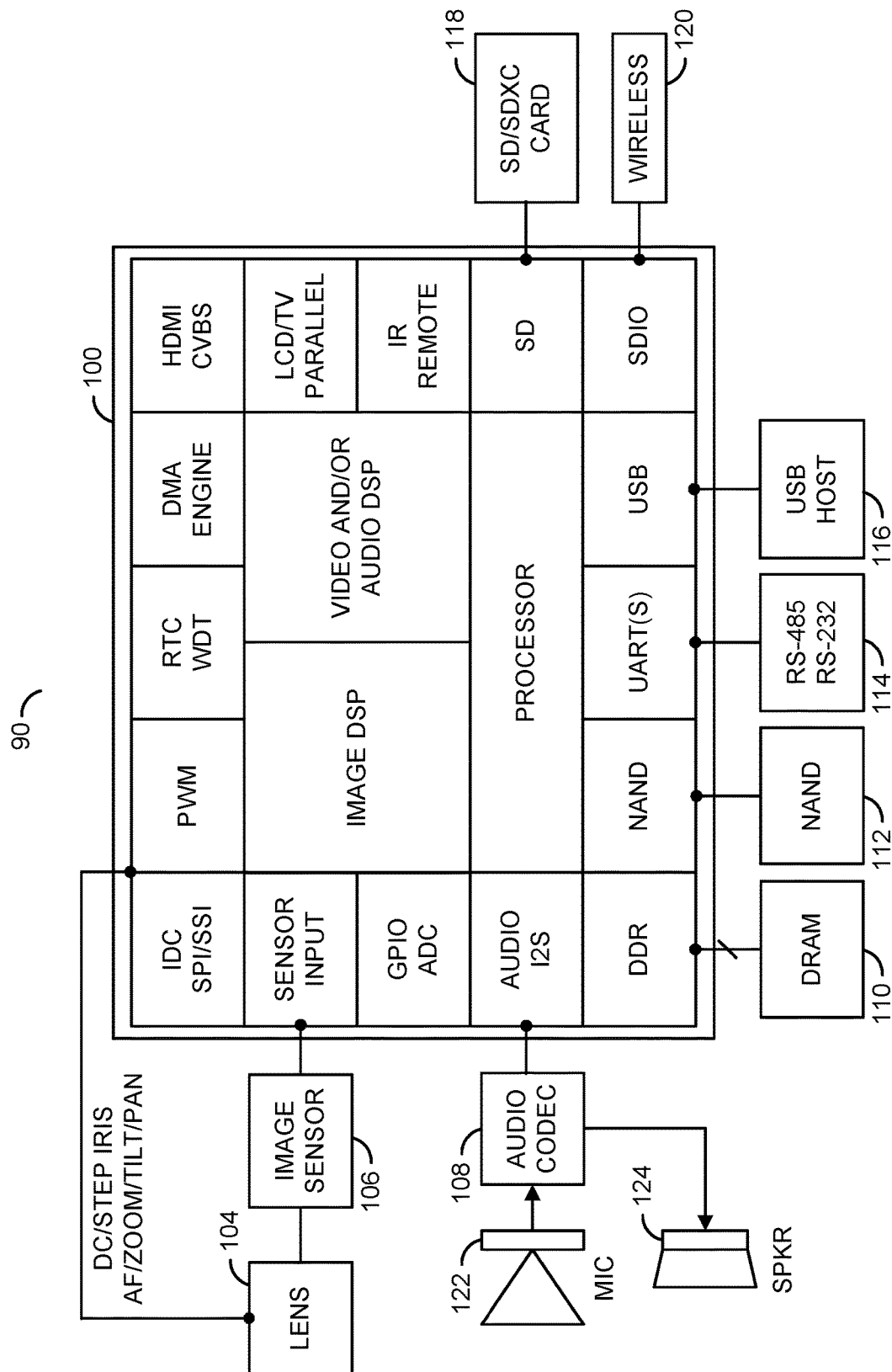
FIG. 1 is a block diagram of a smart camera system.

Referring to FIG. 1, a block diagram of a smart camera system 90 is shown illustrating an example implementation of a camera/recorder system (or apparatus). In some embodiments, the smart camera system 90 may be a digital video camera, a digital still camera or a hybrid digital video/still camera, collectively and individually referred to as digital cameras. In an example, the electronics of the smart camera system 90 may be implemented as one or more integrated circuits. For example, an application specific integrated circuit (ASIC) or system-on-a-chip (SOC) may be used to implement a processing portion of the smart camera system 90.

In various embodiments, the smart camera system 90 may comprise a camera chip (or circuit) 100, a lens assembly 104, an image sensor 106, an audio codec 108, dynamic random access memory (DRAM) 110, nonvolatile memory (e.g., NAND flash memory, NOR flash memory, etc.) 112, one or more serial interfaces 114, an interface 116 for connecting to or acting as a universal serial bus (USB) host, an interface for connecting to a removable media 118 (e.g., SD—secure digital media, SDXC—secure digital extended capacity media, etc.), a wireless interface 120 for communicating with a portable user device, a microphone 122 for recording audio, and a speaker 124 for playing audio. In some embodiments, the lens assembly 104 and the image sensor 106 may be part of a separate camera connected to the processing portion of the system 90 (e.g., via a video cable, a high definition media interface (HDMI) cable, a universal serial bus (USB) cable, an Ethernet cable, or wireless link).

The camera circuit 100 generally comprises a number of modules (or circuits) including, but not limited to, a pulse width modulation (PWM) module, a real time clock and watchdog timer (RTC/WDT), a direct memory access (DMA) engine, a high-definition multimedia interface (HDMI), an LCD/TV/Parallel interface, a general purpose input/output (GPIO) and an analog-to-digital converter (ADC) module, an infrared (IR) remote interface, a secure digital input output (SDIO) interface module, a secure digital (SD) card interface, an audio inter-IC sound (I2S) interface, an image sensor input interface, and a synchronous data communications interface (IDC SPI/SSI). The camera circuit 100 may also include an embedded processor (e.g., ARM, etc.), an image digital signal processor (DSP), and a video and/or audio DSP. In embodiments incorporating the lens assembly 104 and image sensor 106 in the system 90, the camera circuit 100 may be configured (e.g., programmed) to control the lens assembly 104 and receive image data from the sensor 106. The wireless interface 120 may include support for wireless communication by one or more wireless protocols such as Bluetooth®, ZigBee®, Institute of Electrical and Electronics Engineering (IEEE) 802.11, IEEE 802.15, IEEE 802.15.1, IEEE 802.15.2, IEEE 802.15.3, IEEE 802.15.4, IEEE 802.15.5, and/or IEEE 802.20. The camera circuit 100 may also include support for communicating using one or more of the universal serial bus protocols (e.g., USB 1.0, 2.0, 3.0, etc.). The camera circuit 100 may also be configured to be powered via the USB connection. However, other communication and/or power interfaces may be implemented accordingly to meet the design criteria of a particular application.

In various embodiments, programming code (e.g., executable instructions for controlling various processors and encoders of the camera circuit 100) may be stored in one or more of the memories 110 and 112. When executed by the camera circuit 100, the programming code generally causes one or more processors in the camera circuit 100 to configure video synchronization operations and start video frame processing operations. The resulting compressed video signal may be presented to the SD/SDXC card 118, and/or the wireless interface 120, and/or the USB interface 116.

Figure 2:
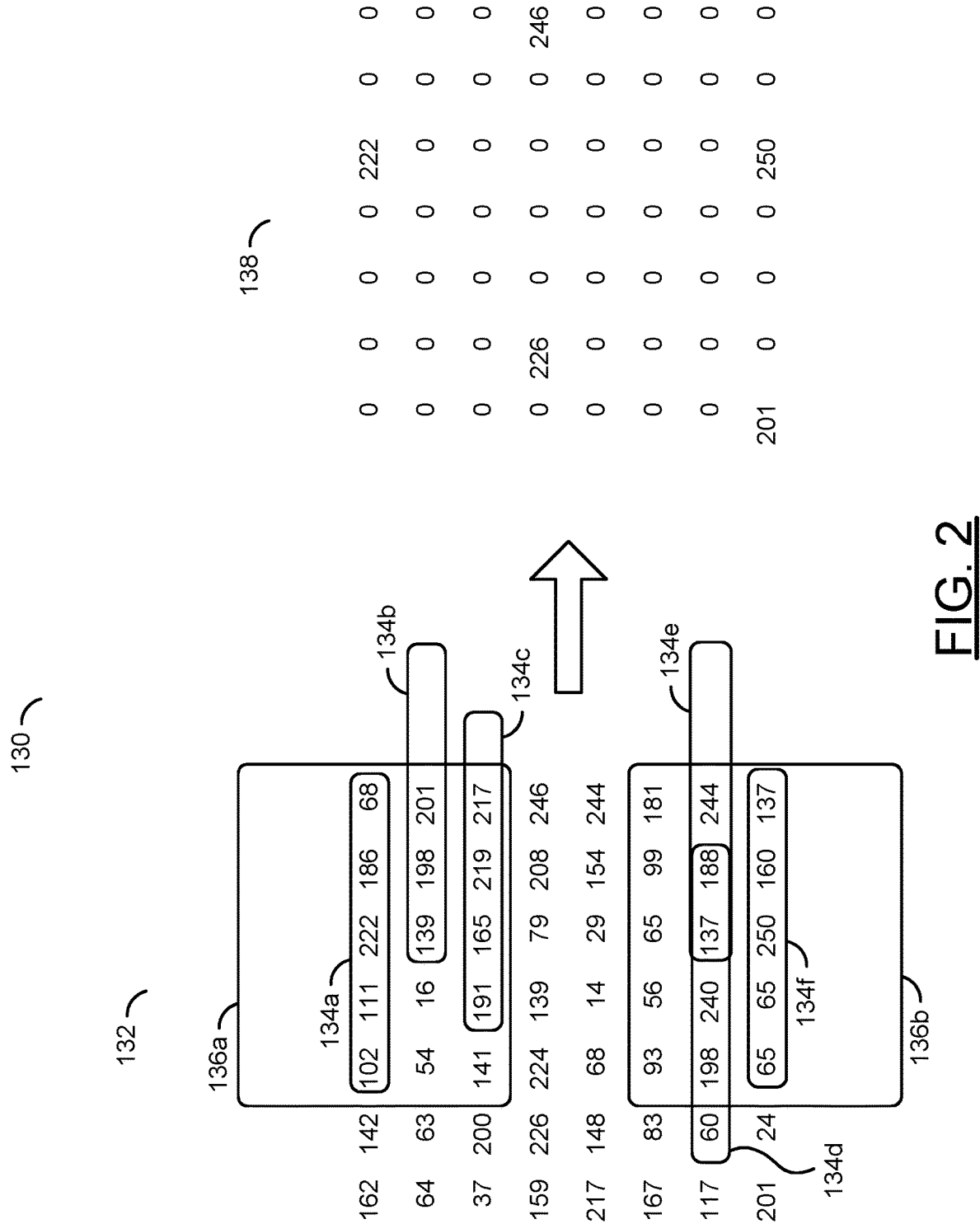
FIG. 2 is a diagram of a non-maximum suppression of an input image.

Referring to FIG. 2, a diagram 130 of an example non-maximum suppression of an input image 132 is shown. The input image 132 may be received from the image sensor 106 in a raster scan order. After processing by the camera chip 100, an output image 138 may be generated. The input image 132 and the output image 138 may each have dimensions of height H by width W. In the diagram 130, several one-dimensional (1 line high×N pixels wide) windows 134a-134f and several two-dimensional (M lines high×N pixels wide) windows 136a-136b are illustrated to help explain how circuitry in the camera chip 100 performs the non-maximum suppression process.

Figure 3:
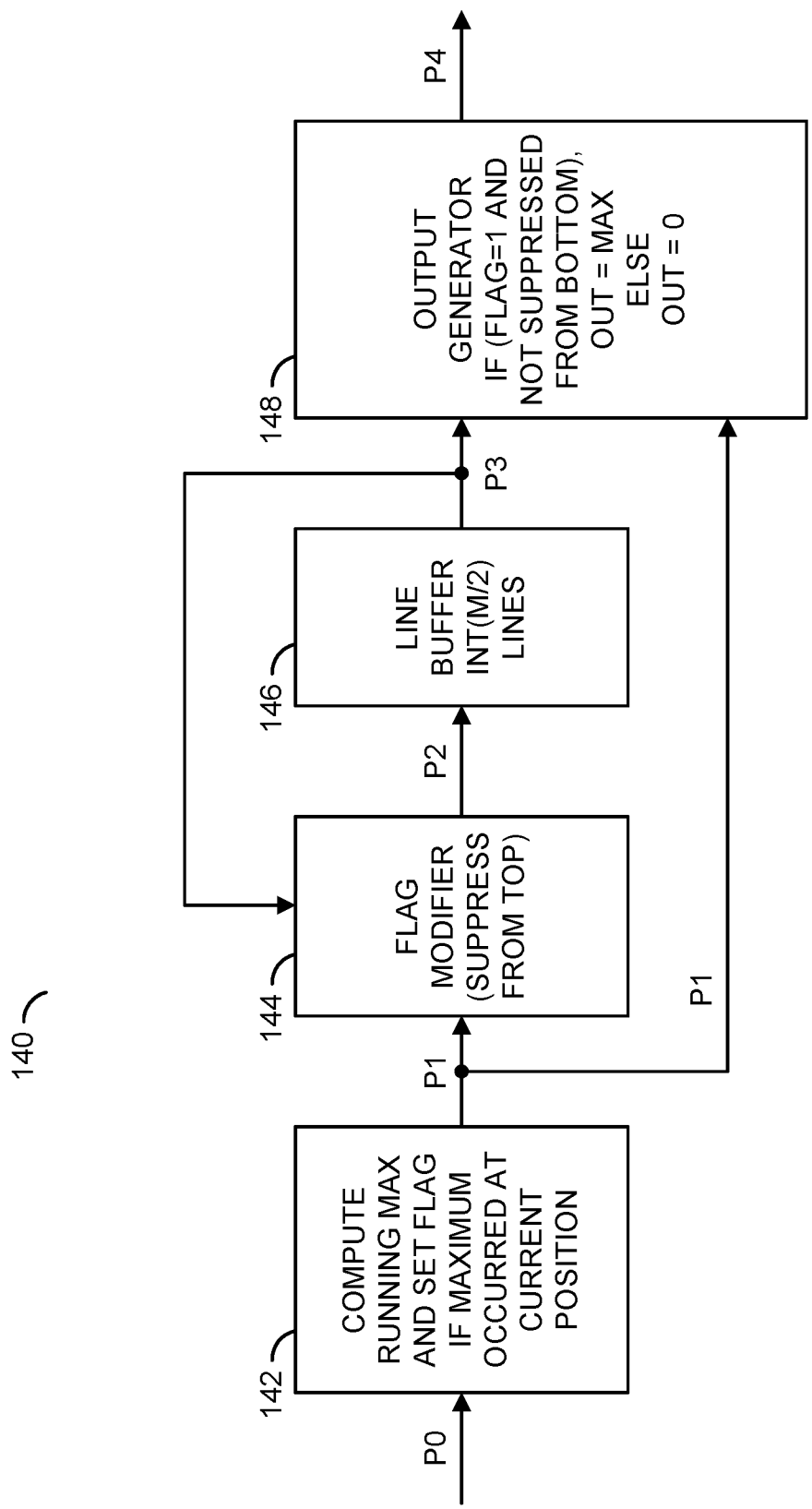
FIG. 3 is a block diagram of a non-maximum suppression circuit.

Referring to FIG. 3, a block diagram of an example implementation of a block (or circuit) 140 is shown in accordance with an embodiment of the invention. The circuit 140 may be implemented in the camera chip 100. The circuit 140 may be referred to as a non-maximum suppression (NMS) circuit 140. The NMS circuit 140 generally comprises a block (or circuit) 142, a block (or circuit) 144, a block (or circuit) 146, and a block (or circuit) 148. The circuits 142-148 may be implemented in hardware, software, firmware or any combination thereof in an apparatus (or device). In some embodiments, the circuits 142-148 are implemented as only hardware.

An input signal (e.g., P0) may be received by the circuit 142. The signal P0 may convey the images received from the image sensor 106 in the raster scan order. An intermediate signal (e.g., P1) may be generated by the circuit 142 and presented to the circuits 144 and the circuit 148. The signal P1 may carry the input raster lines and the corresponding flags. The circuit 144 may generate a signal (e.g., P2) received by the circuit 146. The signal P2 may carry the input raster lines and the flags as modified by the circuit 144. An intermediate signal (e.g., P3) may be generated by the circuit 146 and presented to the circuit 148 and feed back to the circuit 144. The signal P3 may carry the raster lines and modified flags received from the circuit 144. The circuit 148 may generate and present an output signal (e.g., P4). The signal P4 may convey a non-maximum suppressed image (e.g., the output image 138 in FIG. 2).

The circuit 142 may implement a running maximum circuit (or input circuit for short). The input circuit 142 is generally operational to receive the incoming pixels via the signal P0 in raster scan order and compute a running maximum value at every pixel position. The input circuit 142 may also be operational to set a corresponding flag (e.g., a one-bit flag) to an asserted logic state (e.g., a logical one state) to indicate that the maximum value occurred at the current position. The corresponding flags may be referred to as flags IS_MAX. All flags IS_MAX may reset (or defaulted) to an inactive logic state (e.g., a logical zero state) at the start of the input image 132. In various embodiments, the input circuit 142 may be implemented using multiple pipeline stages in hardware to achieve a given frequency, performance, and/or technology. For each of the pixel values, the input circuit 142 may present the corresponding flag IS_MAX and a true NMS maximum value (e.g., MAX) as a concatenated pair of values (e.g., {IS_MAX, MAX}) in the signal P1.

Referring back to FIG. 2, by way of example, the circuit 142 may receive the input image 132 in a raster order starting with the pixel (e.g., luminance) value 162 and continuing across the top row to the pixel value 68. A one-dimensional window may be used by the input circuit 142 to select neighboring pixels about a current input pixel location. By way of example, each window may have the width N (e.g., N=5) and a height M of one in an N×M NMS window. As pixel values are added to the window, the current input pixel value 162 in the center of the window may be the maximum pixel value among 162, 142, and 102. Missing pixels before (to the left of) the pixel value 162 may be defaulted to zero. As such, a corresponding flag IS_MAX may be set (to the logical one value) to indicate that the current input pixel value 162 is the maximum value in the window.

The corresponding flags IS_MAX for the pixel values 142 and 102 may remain reset (to the logical zero value). The flag for the pixel values 142 may be kept in the reset state because when the pixel value 142 was the current input pixel value (e.g., at the center location in the window), the pixel value 162 was still in the window and was larger than 142. Likewise, the flags IS_MAX corresponding to the pixel values 102 and 111 may remain in the reset state due the presence of larger neighboring pixel values.

As more pixel values are received by the circuit 142, the window may shift rightward. An example window 134*a* is shown centered around a current input pixel value of 222. The current input pixel value 222 is the maximum value among 102, 111, 222, 186, and 68 so the corresponding flag IS_MAX may be set for the pixel value 222. The flags IS_MAX corresponding to the pixel values 186 and 68 may remain in the reset state due to the neighboring pixel value 222.

Returning to FIG. 3, the circuit 144 may implement a flag modifier circuit (or modifier circuit for short). The modifier circuit 144 is generally operational to modify the flags IS_MAX received in the signal P2 based on a previous raster line received in the signal P3. The modifier circuit 144 may suppress false local maximum values from the top (e.g., earlier raster lines in the input image 132).

Returning to FIG. 2, the input circuit 142 may identify a pixel value of 201 as a local maximum value in a one-dimensional window 134*b* in the second-from-the-top raster line (e.g., pixel values 64 to 201). The modifier circuit 144 may consider modifying the flag IS_MAX corresponding to the local maximum value 201 based the top raster line (e.g., pixel values 162 to 68), as received in the signal P3. The modifier circuit 144 may use a two-dimensional N×M (e.g., 5×5 pixels) NMS window 136*a* surrounding the current input pixel value 201 to evaluate the flag IS_MAX for the corresponding current input pixel value 201. Since the pixel value 222 is in the NMS window 136*a* and is larger than the pixel value 201, the flag IS_MAX for the pixel value 201 is reset to the inactive (e.g., the logical zero state). The modified flag IS_MAX for the second-from-the-top raster line may be presented in the signal P2 to the circuit 146. In various embodiments, unmodified flags IS_MAX may not be written into the circuit 146.

In the third-from-the-top raster line, a local maximum pixel value of 219 may be flagged by the input circuit 142 in a one-dimensional window 134*c*. The modifier circuit 144 may evaluate the pixel value 219 based on the other pixel values within the NMS window 136*a* from the two earlier raster lines received in the signal P3. Since the pixel value 222 is larger than the pixel value 219, the modifier circuit 144 may reset the flag IS_MAX corresponding to the pixel value 219 to inactive (e.g., the logical zero state). The modified flag IS_MAX for the third-from-the-top raster line may be presented in the signal P2 to the circuit 146.

Returning to FIG. 3, the circuit 146 may be implemented as a line buffer (or memory). The line buffer 146 may be operational to buffer the pixel values and the corresponding flags of the raster lines as received in the signal P2. In the width direction of the input image 132, the line buffer 146 may store entire raster lines with the corresponding flags. In the height direction of the input image 132, the line buffer 146 may have a capacity to hold up to and including an integer number of one half the raster lines with flags (e.g., integer (M/2) rounded up, or ceiling ⌈M/2⌉). The pixel values and the flags may be presented in the signal P3. When reading from the line buffer 146, extra output pixels may be padded with a zero value at the beginning and at the end of the images and the raster lines.

The circuit 148 may implement an output generator circuit (or generator circuit for short). The generator circuit 148 is generally operational to present output pixels of the output image 138. The output pixels may be presented in the raster scan order. The generator circuit 148 may suppress false local maximum values from the bottom (e.g., lower raster lines in the input image 132). If the flag IS_MAX of a current input pixel has been set by the input circuit 142, not reset by the modifier circuit 144 and is not suppressed from below by the generator circuit 148, the generator circuit 148 may present the maximum value MAX of the current output pixel in the signal P4. Otherwise, a zero value is presented in the signal P4 for the current output pixel.

Returning to FIG. 2, the circuits 142 and 144 may determine that a pixel value 240 is the local maximum value in a second-from-the-bottom raster line (e.g., 117 to 244) in a one-dimensional window 134*d*. Likewise, a pixel value 244 in a one-dimensional window 134*e* may also have the corresponding flag IS_MAX set to active (e.g., the logical one state). As the second-from-the-bottom raster line is analyzed by the generator circuit 148, the pixel values in the bottom raster line and a synthesized all-zero raster line below the bottom raster line may be considered. The bottom pixel line may be received in the signal P1 from the circuit 142. In the example illustrated, a local maximum value 250 may be detected in a one-dimensional window 134*f* in the bottom raster line. The generator circuit 148 may compare the local maximum values 240 and 244 against the pixel value 250, all within an NMS window 136*b*. Since the pixel value 250 is larger than both the pixel values 240 and 244, the flags IS_MAX for the pixel values 240 and 244 may be reset to inactive by the generator circuit 148. The generator circuit 148 may present zero values in the signal P4 in the positions of the suppressed-from-below pixel values 240 and 244. The resulting output image 138 in the signal P4 may include only the local maximum pixel values.

Figure 4:
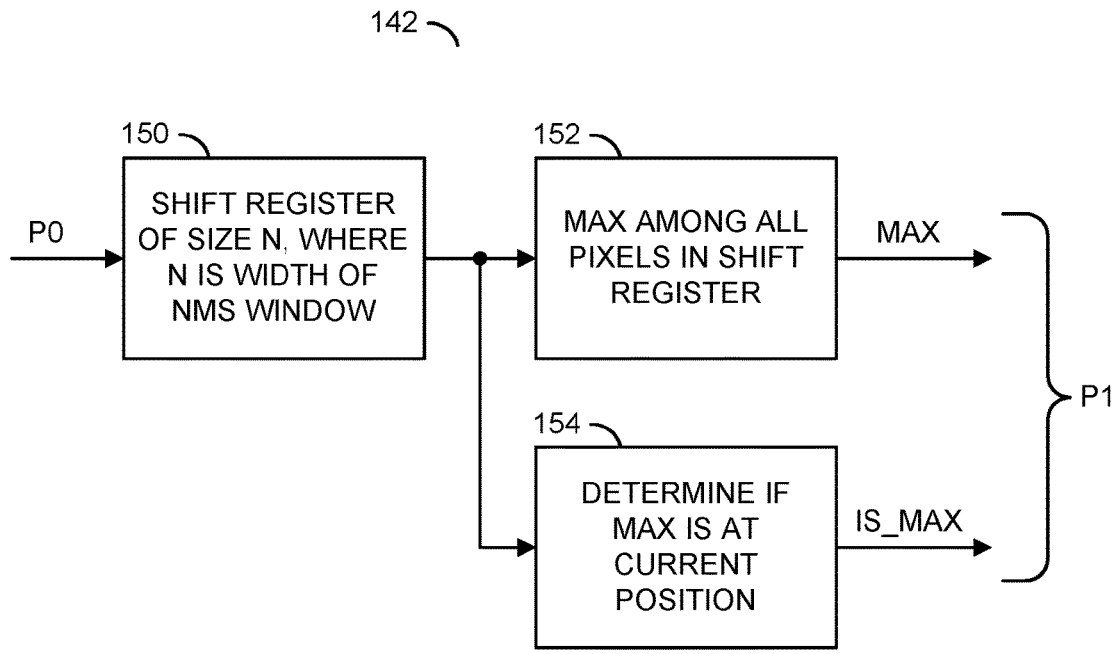
FIG. 4 is a block diagram of an input circuit.

Referring to FIG. 4, a block diagram of an example implementation of the input circuit 142 is shown. The circuit 142 generally comprises a block (or circuit) 150, a block (or circuit) 152, and a block (or circuit) 154. The circuits 150-154 may be implemented in hardware, software, firmware or any combination thereof in an apparatus (or device). In some embodiments, the circuits 150-154 are implemented as only hardware.

The signal P0 may be received by the circuit 150. The signal P1 generally comprises multiple (e.g., two) components. One component may be the maximum values MAX, generated by the circuit 152. The other component may be the flags IS_MAX, generated by the circuit 154.

The circuit 150 may implement a shift register circuit. The shift register 150 may have the size N to match the width of the NMS windows (e.g., 136*a*-136*b*). The shift register 150 may be operational to shift N pixel values at a time to the circuits 152 and 154.

The circuit 152 may implement a maximum-seeking circuit. The maximum-seeking circuit 152 may be operational to determine the maximum value among the pixel values in the shift register 150. The maximum value may be presented as the value MAX in the signal P1.

The circuit 154 may implement a flag-setting circuit. The flag-setting circuit 154 may be operational to determine if the maximum value occurs at a current position (e.g., the middle location in the 1×N one-dimensional window buffered in the shift register 150). If the maximum value is in the current position, the flag-setting circuit 154 may present the corresponding flag IS_MAX set to active in the signal P1.

For flags IS_MAX corresponding to non-maximum values, the flag-setting circuit 154 may present the flags IS_MAX as inactive in the signal P1.

Figure 5:
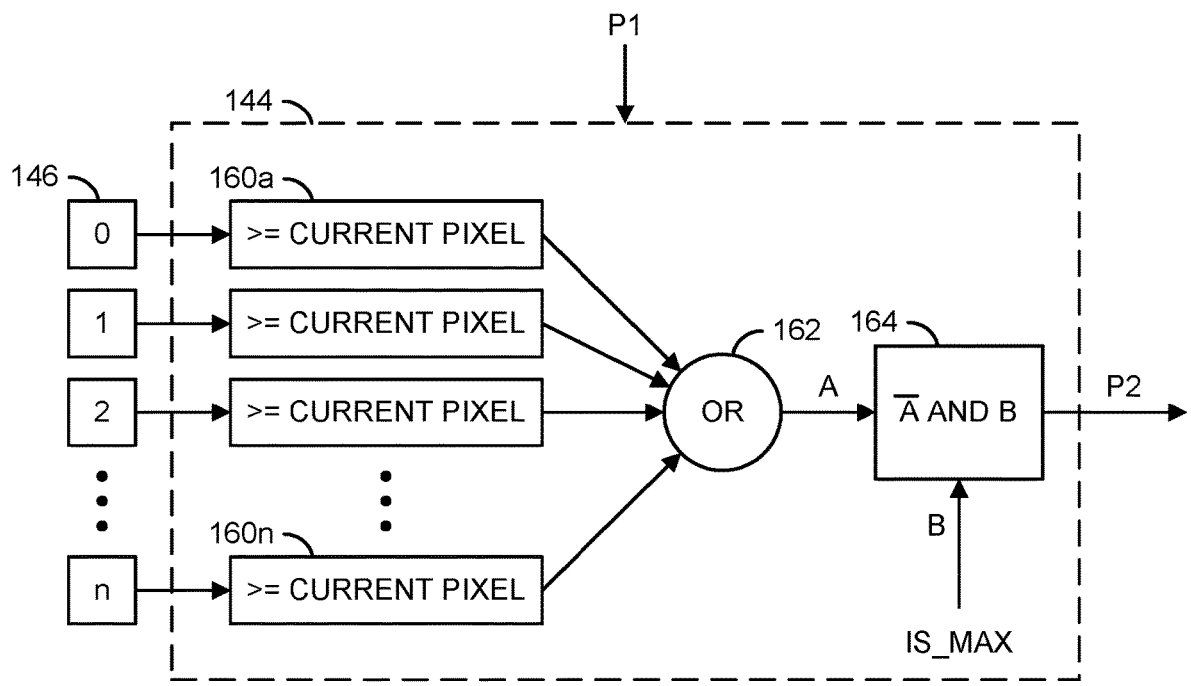
FIG. 5 is a block diagram of a modifier circuit.

Referring to FIG. 5, a block diagram of an example implementation of the modifier circuit 144 is shown. The circuit 144 generally comprises multiple blocks (or circuits) 160a-160n, a block (or circuit) 162, and a block (or circuit) 164. The circuits 160a-164 may be implemented in hardware, software, firmware or any combination thereof in an apparatus (or device). In some embodiments, the circuits 160a-164 are implemented as only hardware.

The circuits 160a-160n may receive the signal P3 from the line buffer 146. A current input pixel value may be presented to the circuits 160a-160n in the signal P1. A signal (e.g., A) may be generated by the circuit 162 and transferred to the circuit 164. The flag IS_MAX of the current input pixel may be received by the circuit 164 in the signal P1 from the input circuit 142. The circuit 164 may generate the signal P2.

Each circuit 160a-160n may implement a comparison circuit. The comparison circuits 160a-160n are generally operational to compare the current input pixel value received in the signal P1 with the respective N pixel values of a two-dimensional NMS window received in the signal P3. The N pixel values may be from one or more previous raster lines stored in the line buffer 146. If the current input pixel value is less than or matches the respective pixel value in the NMS window, the respective comparison circuit 160a-160n may generate a true value. Otherwise, the respective comparison circuit 160a-160n may generate a false value.

The circuit 162 may implement an N-input logical OR gate. The OR gate 162 may perform a Boolean OR operation on the N true/false results determined by the comparison circuits 160a-160n. If one or more true values are received, the OR gate 162 may generate a true value in the signal A (e.g., suppression from the top due to a larger pixel value). If all false values are received, the OR gate 162 may generate a false value in the signal A (not suppression from the top).

The circuit 164 may implement a 2-input logical AND gate. The AND gate 164 may perform a Boolean AND operation on an inverse of the value in the signal A and the current flag IS_MAX, received in the signal B. If the inverse value in the signal A is true (e.g., A=false, not suppressed from the top), the value of the current flag IS_MAX is presented in the signal P2. If the inverse value in the signal A is false (e.g., A=true, suppressed from the top), the value of the current flag IS_MAX is reset to inactive and presented in the signal P2.

Figure 6:
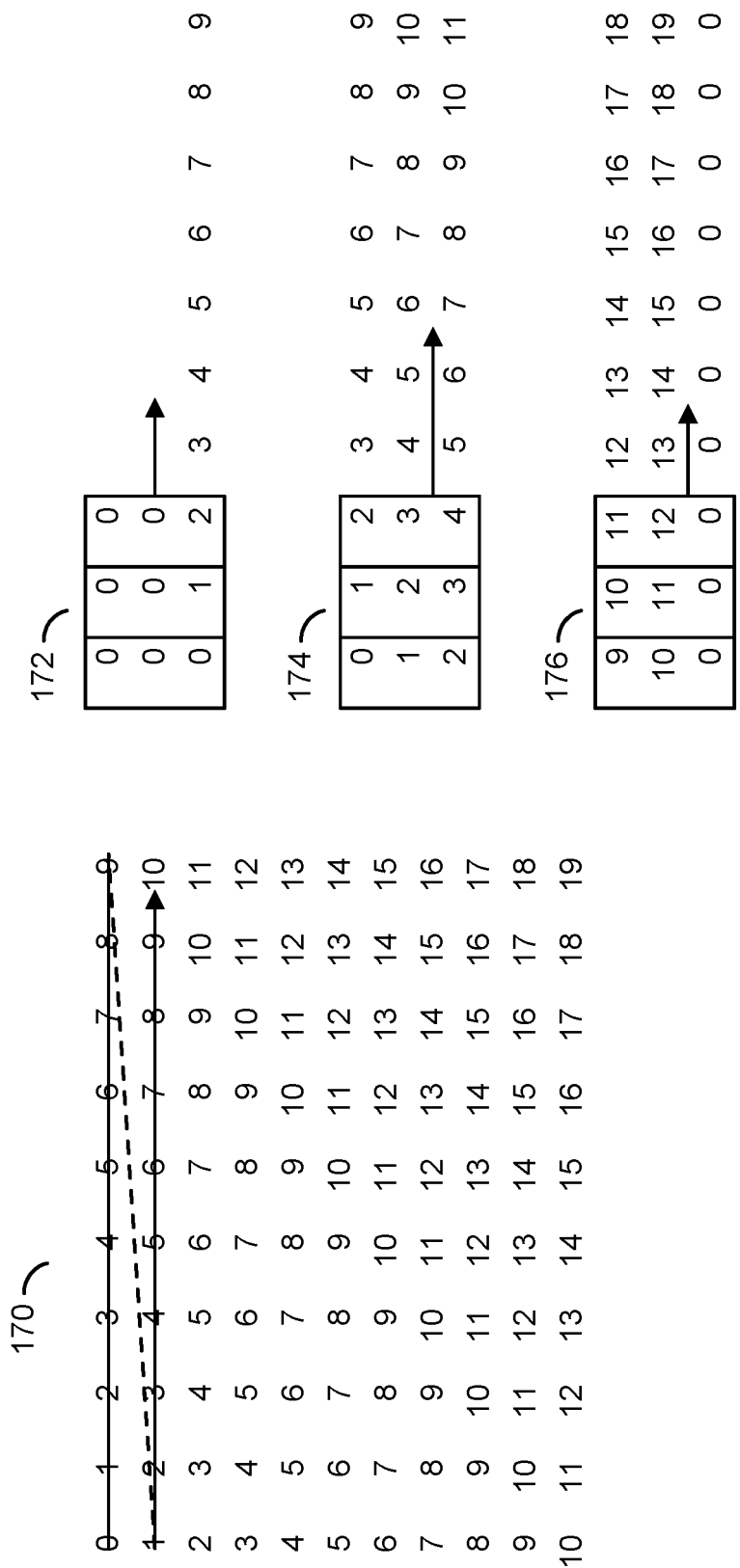
FIG. 6 is a set of pixel positions relative to line buffer reads and writes.

Referring to FIG. 6, a set of pixel positions are shown illustrating example input pixels written to the line buffer 146 and output pixels read from the line buffer 146. The input pixel of an image (e.g., a 10×10 image) may be written into the line buffer 146 in the raster scan order, as illustrated in 170. The pixels of the top raster scan line may be written from left-to-right from positions 0 to 9. Subsequent raster scan lines 1-10 may be written in ascending order.

After the top raster line has been written into the line buffer 146, the top raster line may be read from the line buffer 146 in the signal P3. Zero pixel values may be synthesized in the signal P3 for the integer (M/2) rounded down (or floor $\lfloor M/2 \rfloor$) raster lines above the top raster line, as illustrated in 172.

After the second-from-the-top raster line has been written into the line buffer 146, the top integer M/2 raster lines may be read from the line buffer 146 in the signal P3. The top integer M/2 raster lines, illustrated in 174, may include the top three raster lines with no padded lines above the top raster line. After the bottom raster line has been written into the line buffer 146, a synthesized all-zero raster line and the bottom two raster lines may be read, as illustrated in 176.

Figure 7:
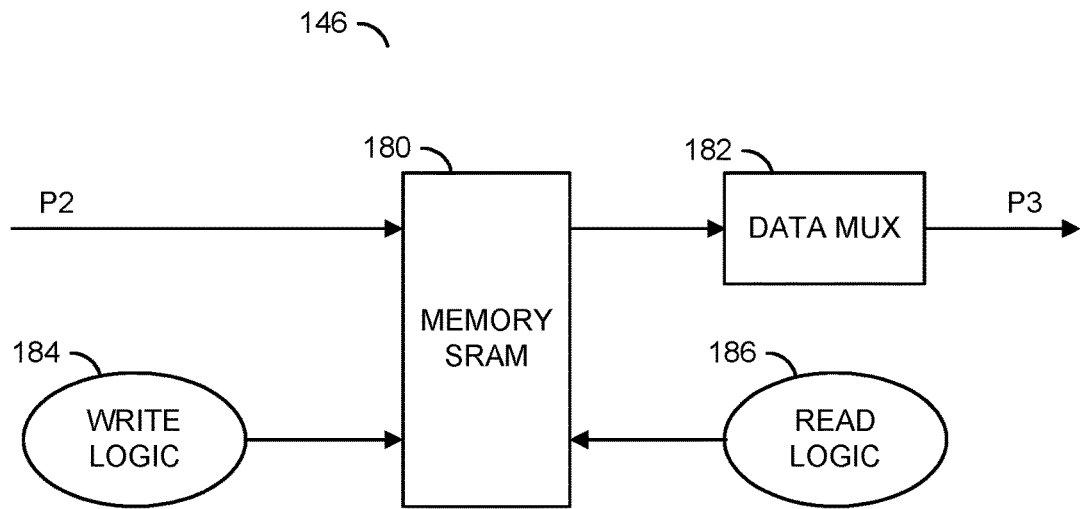
FIG. 7 is a block diagram of the line buffer.

Referring to FIG. 7, a block diagram of an example implementation of the line buffer 146 is shown. The line buffer 146 generally comprises a block (or circuit) 180, a block (or circuit) 182, a block (or circuit) 184, and a block (or circuit) 186. The circuits 180-186 may be implemented in hardware, software, firmware or any combination thereof in an apparatus (or device). In some embodiments, the circuits 180-186 are implemented as only hardware.

The circuit 180 may implement a memory circuit. In some embodiments, the memory 180 may be a static random access circuit (SRAM). Other memory types may be implemented to meet the design criteria of a particular application. The memory 180 may receive the pixel values and the flags IS_MAX in the signal P2 from the modifier circuit 144.

The circuit 182 may implement a data multiplex circuit. The data multiplex 182 is generally operational to multiplex the values MAX and the corresponding flags IS_MAX into the concatenated pair of values {IS_MAX, MAX}. The concatenated pair of values may be presented in the signal P3.

The circuit 184 may implement a write logic circuit. The write logic is generally operational to generate write addresses to store the values MAX and the flags IS_MAX in the memory 180. In some embodiments, each value MAX and corresponding flag IS_MAX may be stored at separate addresses in the memory 180.

The circuit 186 may implement a read logic circuit. The read logic is generally operational to generate read addresses to read the values MAX and the flags IS_MAX from the memory 180. In some embodiments, each value MAX and corresponding flag IS_MAX may be read from separate addresses in the memory 180.

Figure 8:
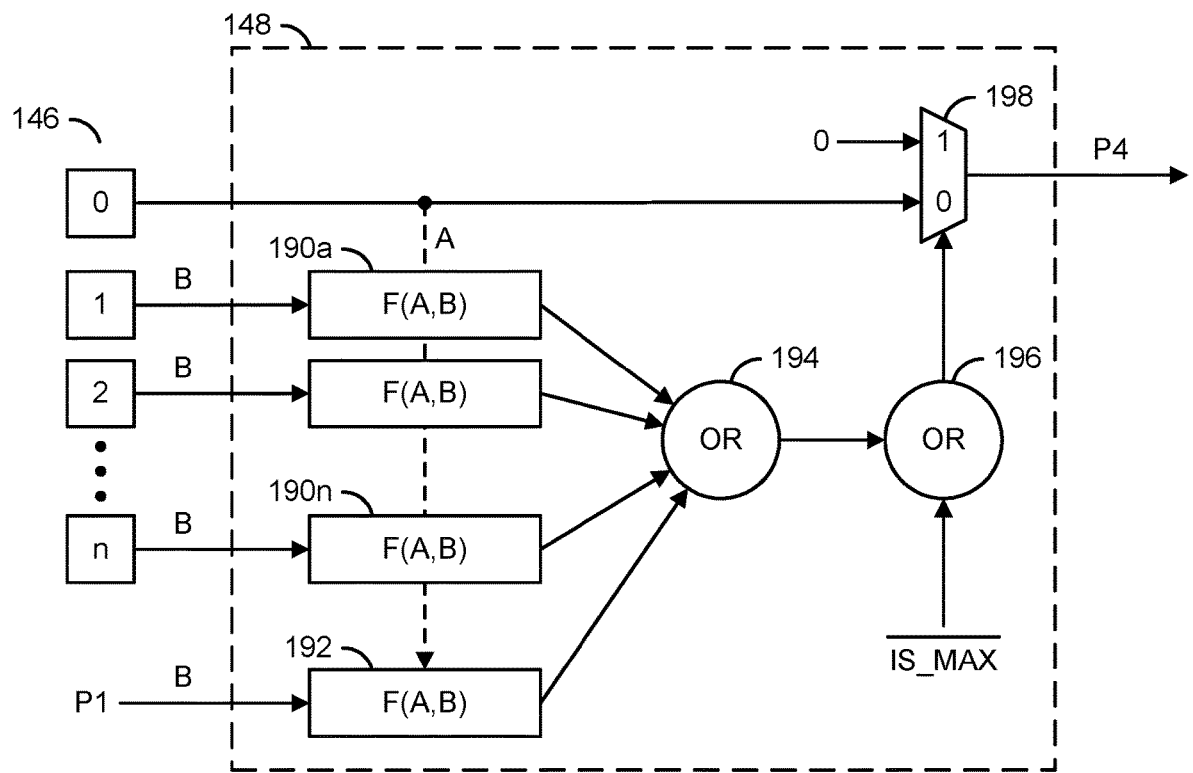
FIG. 8 is a block diagram of a generator circuit.

Referring to FIG. 8, a block diagram of an example implementation of the generator circuit 148 is shown. The generator circuit 148 generally comprises multiple blocks (or circuits) 190a-190n, a block (or circuit) 192, a block (or circuit) 194, a block (or circuit) 196, and a block (or circuit) 198. The circuits 190a-198 may be implemented in hardware, software, firmware or any combination thereof in an apparatus (or device). In some embodiments, the circuits 190a-198 are implemented as only hardware.

Each circuit 190a-190n may implement a logic circuit. The logic circuits 190a-190n are generally operational to compare the pixel values inside a two-dimensional NMS window with each other. Each logic circuit 190a-190n may receive the pixel value of a current output pixel (e.g., location [0]) in a signal A. Each logic circuit 190a-190n may receive a respective pixel value of another pixel in the NMS window (e.g., locations [1] to [n]) in a corresponding signal B. Each logic circuit 190a-190n may implement a logical function F(A,B) calculated by formula 1 as follows:

$$F(A,B)=(B>A) \text{ OR } (B==A \text{ AND true NMS}) \quad (1)$$

If one or more of the N pixel values in the signals B are greater than the current output pixel value in the signal A, the circuits 190a-190n may return true values. If one or more of the N pixel values in the signals B matches the current output pixel value in the signal A and a true maximum value in the NMS window is being computed (e.g., true NMS), the circuits 190a-190n may return true values. Otherwise, the circuits 190a-190n may return corresponding false values. The "true NMS" is generally a configuration parameter.

The circuit 192 may implement a logic circuit. The logic circuit 192 is generally operational to compare the current output pixel value in the signal A with a current input pixel value in the signal P1 (e.g., a signal B). The logic circuit 192 may implement the logical function F(A,B) given by formula 1. If the current output pixel in the signal P2/A is greater than the current pixel in the signal P1/B, the logic circuit 192 may return a true value. If the current output pixel value in the signal P2/A matches the current input pixel value in the signal P1/B and a true maximum value in the NMS window is being computed, the logic circuit 192 may return a true value. Otherwise, the circuit 192 may return a false value.

The circuit 194 may implement an N-input logical OR gate. The OR gate 194 may perform a Boolean OR operation on the N true/false results determined by the logic circuits 190*a*-190*n* and 192. If one or more true values are received, the OR gate 194 may generate a true value (e.g., suppression from the below due to a larger pixel value). If all false values are received, the OR gate 194 may generate a false value (not suppression from below).

The circuit 196 may implement a 2-input OR gate. The OR gate 196 may perform a Boolean OR operation on the results of the OR gate 194 and an inverse of the current output flag IS_MAX. If the OR gate 194 indicates suppression (e.g., generates a true value) or the current output flag IS_MAX is inactive (e.g., not a maximum value), the OR gate 196 may generate a logical one value. The circuit 198 may respond to the logical one value by presenting a fixed logical zero value as the current output pixel value in the signal P4. If the OR gate 194 indicates no suppression (e.g., generates a false value) or the current IS_MAX flag is active (e.g., a maximum value), the OR gate 196 may generate a logical zero value. The circuit 198 may response to the logical zero value by routing the current output pixel value in the signal A to the signal P4.

The circuit 198 may implement a multiplexer circuit. The multiplexer 198 is generally operational to route one of the fixed logical zero value or the output pixel value in the signal A to the signal P4 in response to a control signal. The control signal may be generated by the OR gate 196. Where the control signal is a logical one, the multiplexer 198 may route the fixed logical zero value to the signal P4. Where the control signal is a logical zero, the multiplexer 198 may route the maximum pixel value in the signal A to the signal P4.

Figure 9:
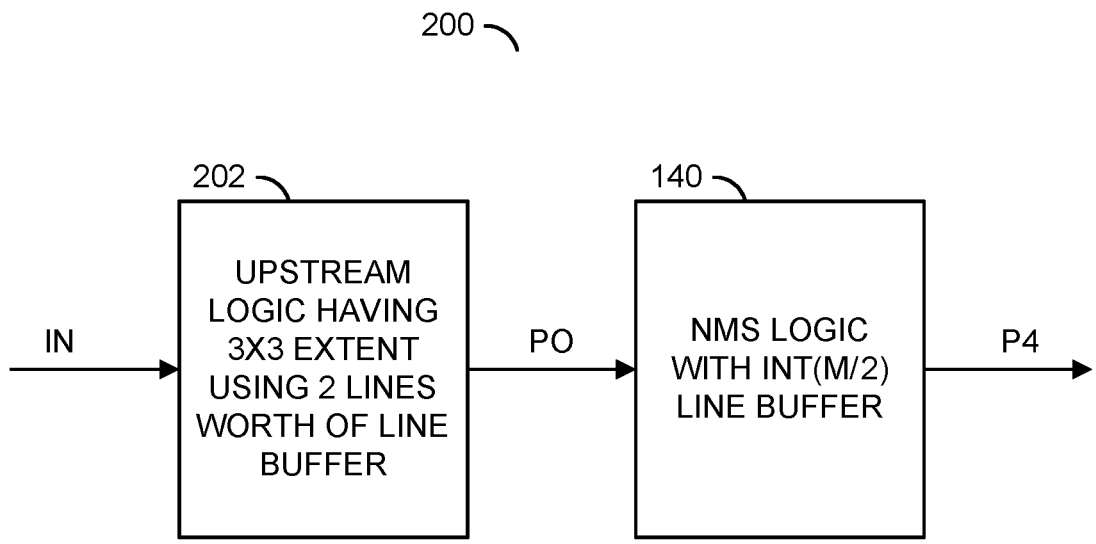
FIG. 9 is a block diagram of a cascaded circuit.

Referring to FIG. 9, a block diagram of an example implementation of a cascaded circuit 200 is shown. The cascaded circuit 200 generally comprises a block (or circuit) 202 and the NMS circuit 140. The circuit 200 may be implemented in the camera chip 100. The additional circuit 202 may be implemented in hardware, software, firmware or any combination thereof in an apparatus (or device). In some embodiments, the circuit 202 may be implemented in only hardware.

A signal (e.g., IN) may be received by the circuit 202. The signal IN may convey the raster lines generated by the image sensor 106. The circuit 202 may generate the signal P0. The signal P0 may be received by the circuit 140. The circuit 140 may generate the signal P4.

The circuit 202 may implement a logic circuit. The logic circuit 202 is generally located upstream of the NMS circuit 140, closer to the image sensor 106. The logic circuit 202 may be operational to perform one or more operations on the images received from the image sensor 106. The operations may include using a small P×Q (e.g., 3×3) extent and buffering up to a few (e.g., two) raster lines. An example operation performed by the logic circuit 202 may include, but is not limited to, sub-pixel resolution, sub-pixel rendering. Once the operations have been completed, the logic circuit 202 may present the processed images to the NMS circuit 140 in the raster scan order in the signal P0.

Figure 10:
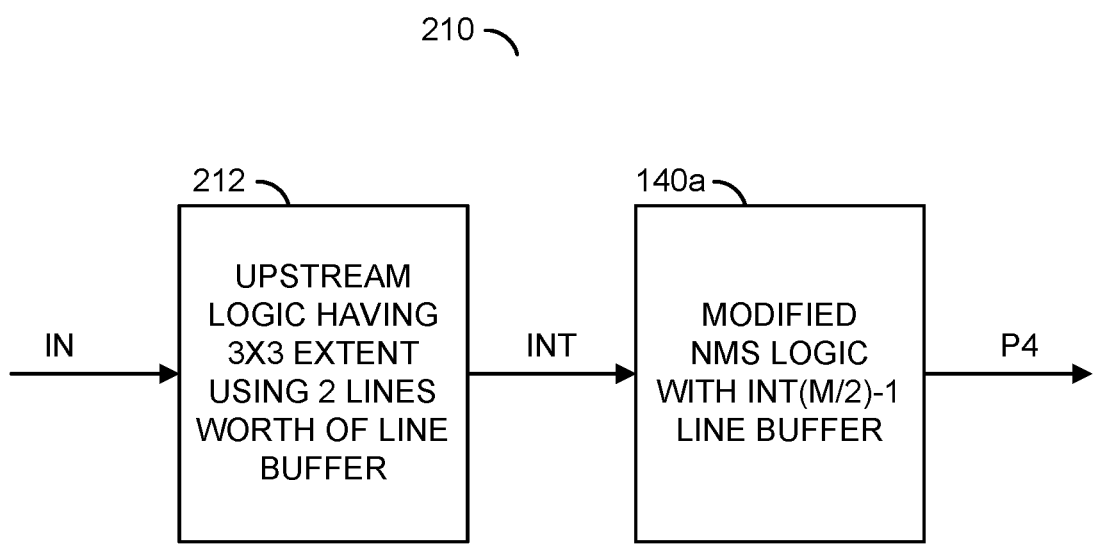
FIG. 10 is a block diagram of another cascaded circuit.

Referring to FIG. 10, a block diagram of an example implementation of a cascaded circuit 210 is shown. The circuit 210 generally comprises a block (or circuit) 212 and a block (or circuit) 140*a*. The circuit 210 may be implemented in the camera chip 100. The circuits 140*a* and 212 may be implemented in hardware, software, firmware or any combination thereof in an apparatus (or device). In some embodiments, the circuits 140*a* and 212 may be implemented in only hardware.

The signal (e.g., IN) may be received by the circuit 212. The circuit 212 may generate an intermediate signal (e.g., INT). The signal INT generally carries the raster lines generated by the image sensor 106 and processed by the circuit 212. The signal INT may also carry additional flag data. The signal INT may be received by the circuit 140*a*. The circuit 140*a* may generate the signal P4.

The circuit 210 generally provides a layered approach to optimize an amount of line buffering performed in the circuit 140*a*. In certain applications, the additional upstream circuit 212 may utilize a two-dimensional extent and may have a line buffer. The line buffer in the upstream circuit 212 may be shared to optimize the line buffer in the circuit 140*a*. By way of example, a 3×3 extent is shown, where M>3. The approach implemented in the circuit 210 may be extended to cover larger extents.

The circuit 140*a* may implement another NMS circuit. The NMS circuit 140*a* may be a variation of the NMS circuit 140. The NMS circuit 140*a* generally performs the same overall non-maximum suppression process as the NMS circuit 140 while buffering fewer raster lines at any given time. In some embodiments, the NMS circuit 140*a* may buffer one fewer than the integer (M/2) rounded up raster lines.

The circuit 212 may implement a logic circuit. The logic circuit 212 may be a variation of the logic circuit 202. The logic circuit 212 is generally located upstream of the NMS circuit 140*a*, closer to the image sensor 106. The logic circuit 212 may be operational to perform one or more operations on the images received from the image sensor 106. The operations may include using the small P×Q (e.g., 3×3) extent and buffering up to a few (e.g., two) raster lines.

The logic circuit 212 may be operational to perform a preliminary detection of maximum pixel values within the small P×Q extent. For example, given a 3×3 extent, the logic circuit 212 may be operational compute four flags that indicate where the maximum value occurs within the 3×3 extent. Suppose the 3×3 extent may be:

| a0 | a1 | a2 |
| b0 | b1 | b2 |
| c0 | c1 | c2 |

The logic circuit 212 may be operational to calculate a maximum value among (a0,a1a2,b0,b1,b2,c0,c1,c2). Several (e.g., four) additional flags or a flag vector (e.g., HAS_MAX[ ]) may be calculated such that:

HAS_MAX[0]=1 if maximum occurs in top row, else=0;
HAS_MAX[1]=1 if maximum occurs in right column, else=0;
HAS_MAX[2]=1 if maximum occurs in bottom row, else=0; and HAS_MAX[3]=1 if maximum occurs in left column, else=0.

The following table may provide values of the flags HAS_MAX[ ].

TABLE 1

| Maximum | HAS_MAX [0] | HAS_MAX [1] | HAS_MAX [2] | HAS_MAX [3] |
|---|---|---|---|---|
| a0 | 1 | 0 | 0 | 1 |
| a1 | 1 | 0 | 0 | 0 |
| a2 | 1 | 1 | 0 | 0 |
| b0 | 0 | 0 | 0 | 1 |
| b1 | 0 | 0 | 0 | 0 |
| b2 | 0 | 1 | 0 | 0 |
| c0 | 0 | 0 | 1 | 1 |
| c1 | 0 | 0 | 1 | 0 |
| c2 | 0 | 1 | 1 | 0 |

The basic structure of the NMS circuit 140a remains similar to the NMS circuit 140 with a few changes: the modifier circuit 144a may be adjusted from the modifier circuit 144 to account for the additional flags HAS_MAX[ ]; the line buffer 146a may be reduced by one line from the line buffer 146; and the generator circuit 148a may be modified from the generator circuit 148 to account for the additional flags HAS_MAX[ ].

Figure 11:
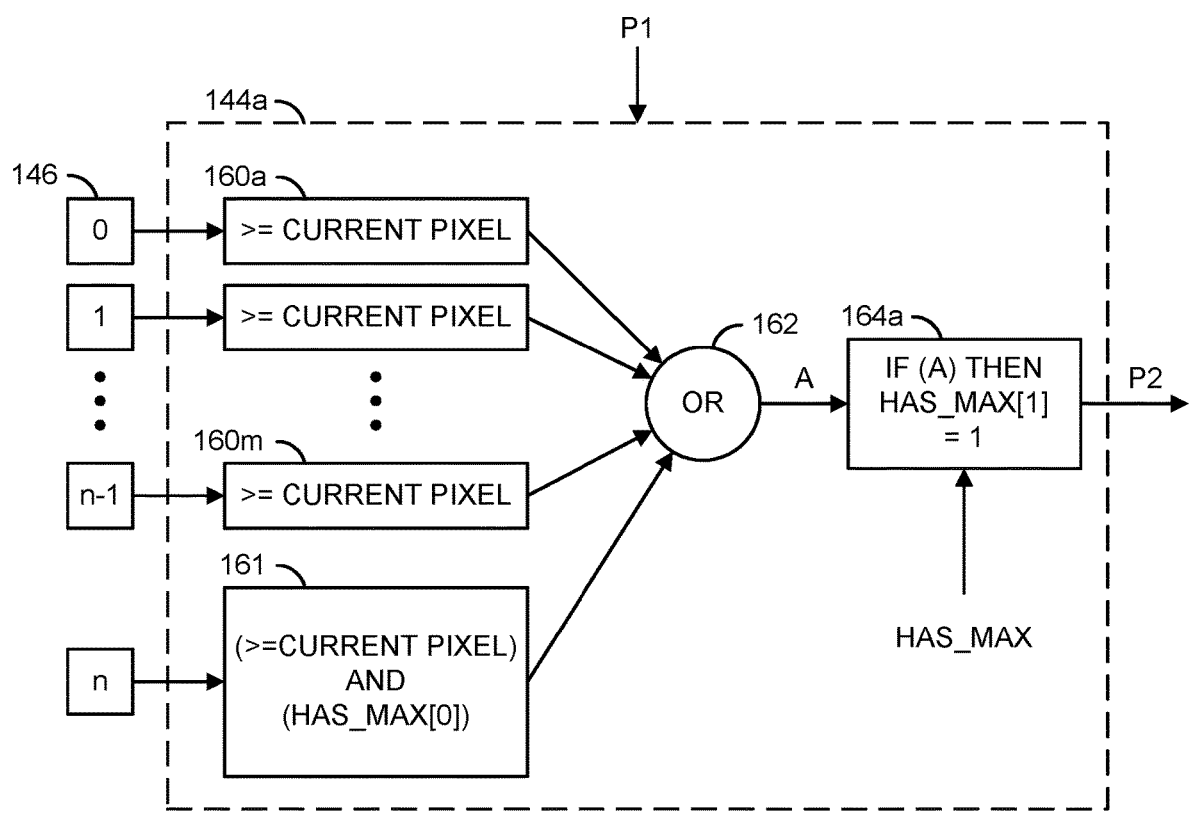
FIG. 11 is a block diagram of another modifier circuit.

Referring to FIG. 11, a block diagram of an example implementation of the modifier circuit 144a is shown. The modifier circuit 144a may be a variation on the modifier circuit 144. The variation may take into account the flags HAS_MAX[ ]. The modifier circuit 144a generally comprises the comparison circuits 160a-160m, a block (or circuit) 161, the OR gate 162 and a block (or circuit) 164a. The circuits 160a-164a may be implemented in hardware, software, firmware or any combination thereof in an apparatus (or device). In some embodiments, the circuits 160a-164a are implemented as only hardware.

The circuit 161 may implement a logic circuit. The logic circuit 161 is generally operational to compare the current input pixel value with a last pixel value (e.g., location [n]) in the signal P3 from the line buffer 146. The last pixel value may be from a previous raster lines stored in the line buffer 146. If the current input pixel value is less than or matches the last pixel value, and the flag HAS_MAX[0] is in the asserted logic state (e.g., a logical one state), the comparison circuit 161 may generate a true value. Otherwise, the comparison circuit 161 may generate a false value.

The circuit 164a may implement another logic circuit. The logic circuit 164a may utilize the results of the OR gate 162 to modify the flag HAS_MAX[1]. If the value in the signal A is true (e.g., suppression from the top due to a larger pixel value), the value in the flag HAS_MAX[1] may be set to the asserted logic state (e.g., the logical one state). Otherwise, the flag HAS_MAX[1] may remain unmodified.

Figure 12:
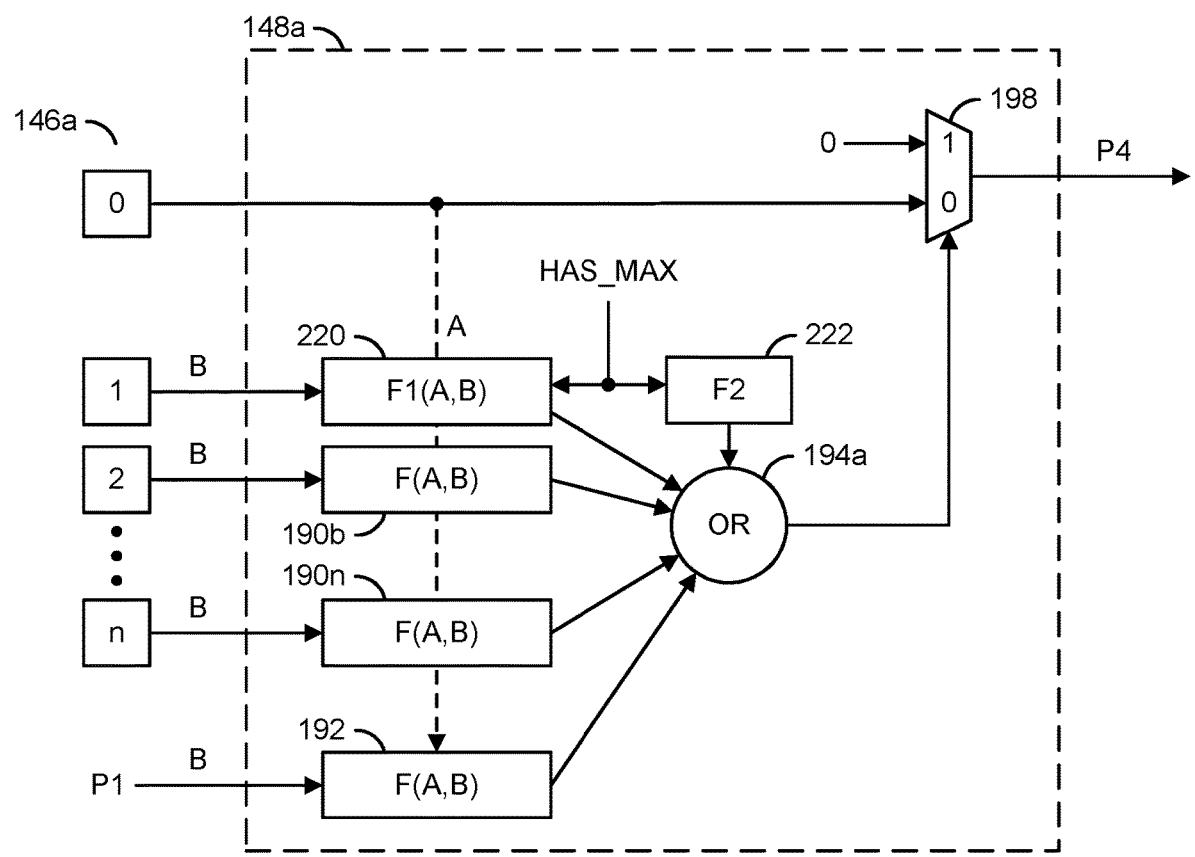
FIG. 12 is a block diagram of another generator circuit.

Referring to FIG. 12, a block diagram of an example implementation of the generator circuit 148a is shown. The generator circuit 148a may be a variation on the generator circuit 148. The variation may take into account the flags HAS_MAX[ ]. The generator circuit 148a generally comprises the logic circuits 190b-190n, the logic circuit 192, a block (or circuit) 194a, the multiplexer 198, a block (or circuit) 220, and a block (or circuit) 222. The circuits 190a-222 may be implemented in hardware, software, firmware or any combination thereof in an apparatus (or device). In some embodiments, the circuits 190a-222 are implemented as only hardware.

The circuit 220 may implement a logic circuit. The logic circuit 220 is generally operation to perform a logical function F1(A,B) on a current output pixel value in the signal A and another pixel value in the signal B, both received from the line buffer 146a. The logical function F1(A,B) may be a variation on the logical function F(A,B) and may be calculated by formula 2 as follows:

$$F1(A,B)=F(A,B) \text{ AND } HAS\_MAX[2] \qquad (2)$$

The circuit 222 may implement another logic circuit. The logic circuit 222 is generally operational to perform a logical function F2 on the flags HAS_MAX[ ]. The logical function F2 may be calculated by formula 3 as follows:

$$F2=HAS\_MAX[0] \text{ OR } HAS\_MAX[1] \text{ OR } HAS\_MAX[2] \text{ OR } HAS\_MAX[3] \qquad (3)$$

If the local maximum pixel value is along a periphery of the small extent, the logic circuit 222 may output a true value. Other wise, the logic circuit 222 may output a false value.

The circuit 194a may implement a multi-input OR gate. The OR gate 194a may be operational to perform a Boolean OR operation on the true/false results determined by the logic circuits 190b-190n, 192, 220 and 222. If any one or more true values are received, the OR gate 194a may generate a true value (e.g., suppression from the below due to a larger pixel value). If all false values are received, the OR gate 194a may generate a false value (not suppression from below). The multiplexer 198 may route either the fixed logical zero value or the current output pixel value in the signal A to the signal P4 based on the control signal generated by the OR gate 194a. An advantage of the layered approach may be that the hardware logic is partitioned into multiple circuits (e.g., 212 and 140a). The multiple circuits may achieve higher performance because of fewer logic levels in each circuit.

Figure 13:
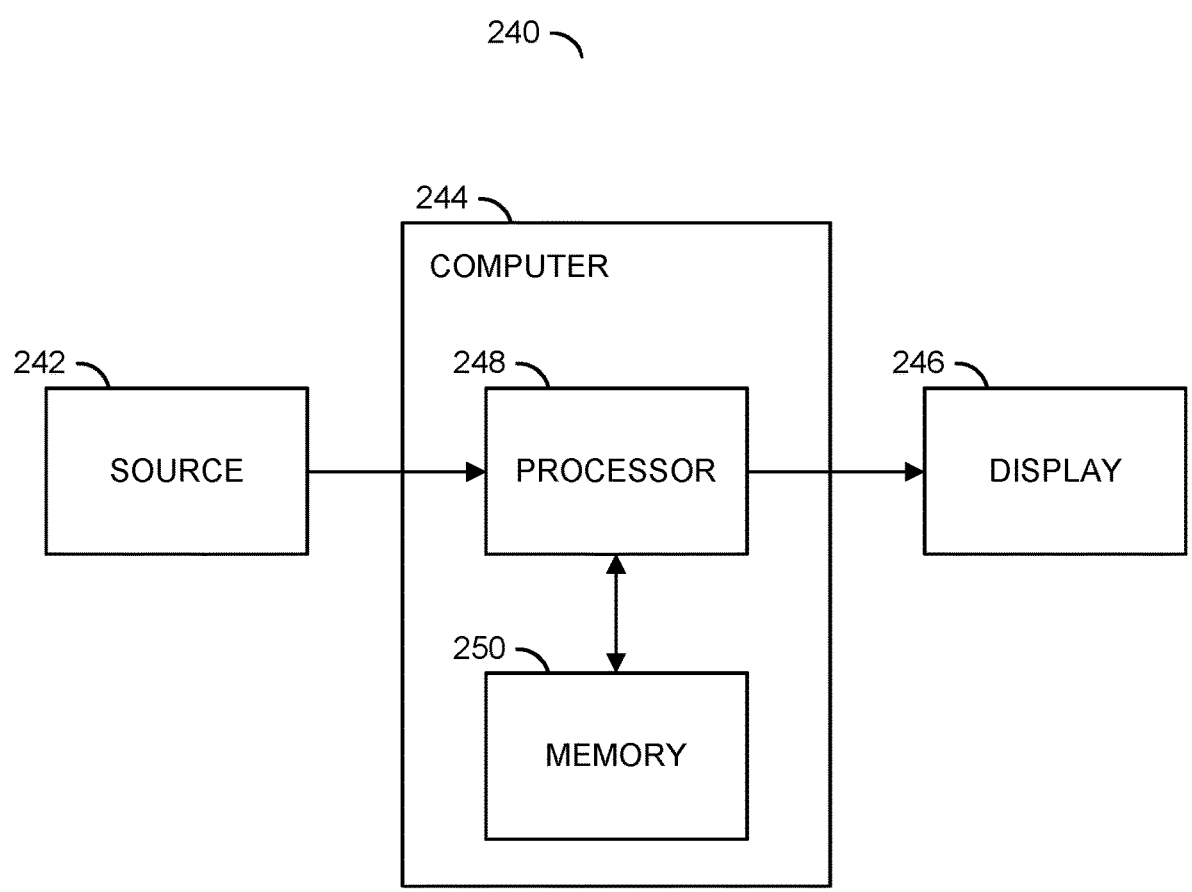
FIG. 13 is a block diagram of a computer vision system.

Referring to FIG. 13, a block diagram of an example implementation of a computer vision system 240 is shown. In some embodiments, the computer vision system 240 may have a source 242 of one or more images, such as the image sensor 106, from another image processing hardware block, directly read from an external memory or internal memory, or from any source of video and/or still pictures. The computer vision system 240 may include one or more computers 244. One or more displays (or monitors) 246 may be used to display the results of images processed by the computer 244. The computer 244 generally comprises a processor 248 and a memory 250. The NMS suppression process may be implemented (e.g., the circuit 140 or the circuit 140a) within the computer 244, for example, in the processor 248.

The functions and structures illustrated in the diagrams of FIGS. 1 to 13 may be designed, modeled, emulated, and/or simulated using one or more of a conventional general purpose processor, digital computer, microprocessor, microcontroller, distributed computer resources and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally embodied in a medium or several media, for example non-transitory storage media, and may be executed by one or more of the processors sequentially or in parallel.

Embodiments of the present invention may also be implemented in one or more of ASICs (application specific integrated circuits), FPGAs (field programmable gate arrays), PLDs (programmable logic devices), CPLDs (complex programmable logic device), sea-of-gates, ASSPs (application specific standard products), and integrated circuits. The circuitry may be implemented based on one or more hardware description languages. Embodiments of the present invention may be utilized in connection with flash memory, nonvolatile memory, random access memory, read-only memory, magnetic disks, floppy disks, optical disks such as DVDs and DVD RAM, magneto-optical disks and/or distributed storage systems.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
   a first circuit configured to set a flag where a current value in a current line of an image is a maximum value in a first window in said current line;
   a second circuit configured to reset said flag based on one or more previous lines of said image where said current value is not a largest value in a second window around said current value; and
   a third circuit configured to generate an output value as (i) said current value if said flag is set and (ii) a predetermined value if said flag is reset.

2. The apparatus according to claim 1, further comprising a fourth circuit configured to buffer said current value and said flag, wherein said third circuit is further configured to (i) receive said flag from said fourth circuit and (ii) reset said flag based on one or more next lines of said image where said current value is not said largest value in said second window around said current value.

3. The apparatus according to claim 1, further comprising a fourth circuit configured to buffer at most a ceiling of one half of said second window at all times.

4. The apparatus according to claim 1, further comprising a fifth circuit configured to (i) buffer at least two lines of said image and (ii) process said image using a two-dimensional extent.

5. The apparatus according to claim 4, wherein said fifth circuit is further configured to (i) generate a plurality of additional flags that identify where a greatest value is located in said two-dimensional extent, and (ii) transfer said additional flags to said first circuit.

6. The apparatus according to claim 5, wherein resetting of said flag in said second circuit is further based on said additional flags.

7. The apparatus according to claim 5, wherein said third circuit is further configured to reset said flag based on one or more next lines of said image and said additional flags where said current value is not said largest value in said second window around said current value.

8. The apparatus according to claim 4, further comprising a fourth circuit configured to buffer at most a ceiling of one half of said second window minus one at all times.

9. The apparatus according to claim 1, wherein said apparatus forms part of a computer vision system.

10. The apparatus according to claim 1, wherein said apparatus forms part of a digital camera.

11. A method for non-maximum suppression in image data, comprising the steps of:
    setting a flag with a circuit where a current value in a current line of an image is a maximum value in a first window in said current line;
    resetting said flag based on one or more previous lines of said image where said current value is not a largest value in a second window around said current value; and
    generating an output value as (i) said current value if said flag is set and (ii) a predetermined value if said flag is reset.

12. The method according to claim 11, further comprising the steps of:
    buffering said current value and said flag in a line buffer; and
    resetting said flag based on one or more next lines of said image where said current value is not said largest value in said second window around said current value.

13. The method according to claim 11, further comprising the step of:
    buffering at most one half rounded up of said second window at all times.

14. The method according to claim 11, further comprising the steps of:
    buffering at least two lines of said image; and
    processing said image using a two-dimensional extent.

15. The method according to claim 14, further comprising the steps of:
    generating a plurality of additional flags that identify where a greatest value is located in said two-dimensional extent; and
    transferring said additional flags to said circuit.

16. The method according to claim 15, wherein resetting of said flag is further based on said additional flags.

17. The method according to claim 15, further comprising the step of:
    resetting said flag based on one or more next lines of said image and said additional flags where said current value is not said largest value in said second window around said current value.

18. The method according to claim 14, further comprising the step of:
    buffering at most a ceiling of one half of said second window minus one at all times.

19. The method according to claim 11, wherein the steps are implemented in one or more of (i) a computer vision system, (ii) a digital camera or (iii) any combination thereof.

20. The method according to claim 11, wherein the second window has fewer columns than said image.

* * * * *